…

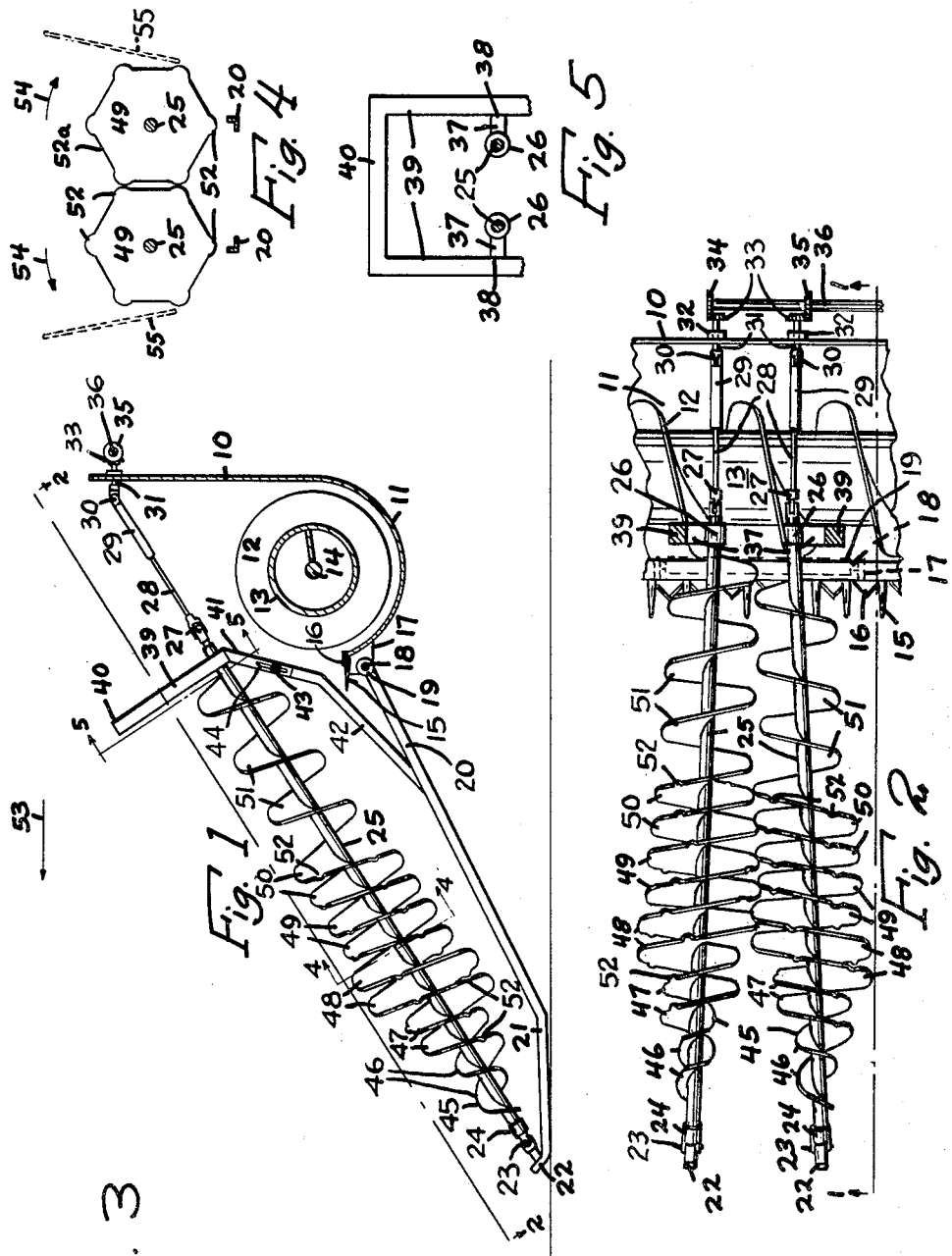

United States Patent Office 2,946,424
Patented July 26, 1960

2,946,424
CROP GATHERING DEVICE
Ralph F. Wiebelhaus and William F. Mohr, both of Laurel, Nebr.

Filed Feb. 28, 1958, Ser. No. 718,242

1 Claim. (Cl. 198—7)

Our invention relates to a crop gathering device.

An object of our invention is to provide a device which will efficiently centralize and straighten the stalks of grain sorghum crops such as milo, etc., so that as the device travels forwardly, these crops will be efficiently directed into the sickle of the attached combine.

A further object of our invention is to provide a device which will efficiently raise the bent crops to the vertical position, and which will also deliver the resultant cut crop into the combine.

A further object of our invention is to provide an arrangement which can be adjusted to different elevations, and which can also be angularly adjusted for different types of crops.

With these and other objects in view, our invention consists in the construction, arrangement, and combination of the various parts of our device, whereby the objects contemplated are attained, as hereinafter more fully set forth, pointed out in our claims, and illustrated in the accompanying drawings, in which:

Figure 1 is a side elevation or sectional view taken along the lines 1—1 of Figure 2, Figure 2 is a plan view of Figure 1, and taken along the lines 2—2 of Figure 1, Figure 3 is a detail, Figure 4 is a sectional view taken substantially along the lines 4—4 of Figure 1, and Figure 5 is a sectional view taken substantially along the lines 5—5 of Figure 1.

Our invention is intended to provide a special device which will raise and straighten out the stalks in a field of the grain sorghum type, it being understood that our invention will also relate to any similar types, and to thence centrally direct such stalks into the cutting mechanism of a combine to which the device is attached.

We have used the character 10 to designate generally a portion of a combine casing, this casing including the lower arcuate portion 11 in which is mounted the transversely positioned larger auger blade 12 attached to the drum 13 which is suitably secured to the shaft 14, the character 15 indicating the sickle guards, and the character 16 the sickle blades of the combine.

We attach to any bracket portion such as 17 of the combine a rod 18 which is received within the cylindrical pipe 19, this arrangement thereby serving to support our device, and extending from the pipe 19 are the lengthened angle members or bars 20 which extend into the portions 21, which portions 21 are attached to the forward shoes 22, and pivoted at 23 to the shoes 22 are the journals 24.

Journalled in the journals 24 are the lengthened shafts 25, and it will be noted from the drawings that these shafts 25 are angularly inclined upwardly, and are also inwardly angularly inclined towards each other as viewed in the top view, Figure 2, toward the combine. The shafts 25 are journalled within the journals 26 and are attached to the universal joints 27, which joints are attached to the male square shafts 28 which are received within the female tubes 29, which are attached to the further universal joints 30 which are attached to the short shafts 31 which are journalled at 32, and which shafts are then attached to the bevel gears 33, the bevel gears 33 being attached to the respective further bevel gears 34 and 35, which gears 34 and 35 are attached to the transverse shaft 36, the transverse shaft 36 traveling to the driving mechanism of the combine and thereby driving the entire arrangement including the shafts 25. The bearings 26 are attached (see Figure 5) to the short bars 37 which in turn are attached at 38 to the vertically positioned posts 39 which posts are attached to the transverse bar 40, this arrangement thereby serving to efficiently hold the spirally arranged units in their correct positions, and attached to the members 39 are the further bracing portions 41 which are secured to the further bracing portions 42, the bolt 43 passing through the slots 44 in the members 41 to provide adjustability so that the shafts 25 can be pitched at various angles if such is desired.

Attached to the shafts 25 and passing helically about the same are the helical blades 45 which are preferably of a double conveyor form, and it should be specifically noted that these blades will gradually increase in diameter and will then decrease in diameter, certain of the blades such as 46 being of a small diameter, the blade portions 47 being of a larger diameter, the blades 48 being of still larger diameter, the blades 49 being slightly smaller in diameter than the blades 48, and the blades 50 being smaller in diameter than the blades 49. It will be noted from Figure 2, however, that the blades should slightly over-lap at the center, the end blade portion 50 then continuing into the conveyor blade portions 51 which are all of the same diameter and being of the single helical type.

Extending from the various blade portions 47, 48, 49 and 50 are the extending protruding portions 52 which provide an important function in our invention and which will be explained later, and these portions 52 can be made substantially as shown in Figure 3, or can be of other shapes. The projections 52 are spaced along the helically arranged members at equal distances along the same, and substantially as shown.

The operation of the device is as follows. As the machine travels forwardly in the direction of the arrow 53, it will be noted that the shafts 25 through the gear arrangements will be driven in opposite directions, or in the directions as shown by the arrows 54 in Figure 4. The bent stalks will be concentrated between the forward members 22, and the first auger, or helical parts 46, will start to centralize and tend to convey the stalks upwardly, and next, the larger portions 47 will start to straighten up the stalks due to the provision of the projecting portions 52, since these portions 52 will exert an upward force against the stalks, and next, the larger portions 48 will increase the action to raise the stalks, and then the further portions 49 and 50 will additionally aid the effect in a slightly diminishing manner until the stalks approach the conveyor portions 51. Certain lower portions of the stalks will then meet the sickle blades 16 and will be cut off, and the upper important head portions of the crops will be directly conveyed into the auger 12 of the combine.

It will be noted that the pipe 19 will permit free pivotal movement as the frames travel through the field, and will also permit the arrangement to be postioned at any height. Also, if it is desired to change the angularity of the shafts 25 for accommodating different types of crops, the bolt 43 can be loosened and re-tightened, the pivoting point 23 allowing relative movement.

The universal joints 27 and 30 together with the telescoping shafts 28 and 29 permit the unit to function efficiently regardless of the angle.

The helically arranged blades 47, 48, etc. shown in Figures 1 and 2 are shown circular instead of having the straight portions 52a (see Figure 4), it being obvious that any such shape can be used.

If desired, angularly inclined side aprons indicated by the dotted lines character 55 in Figure 4 can be positioned as shown and suitably supported from the framework, in case it is desired to accommodate ear crops so that the ears will not fall out of the arrangement.

It will now be noted that we have provided the advantages mentioned in the objects of our invention with further advantages being readily apparent.

Some changes may be made in the construction and arrangement of the parts of our invention without departing from the real spirit and purpose of our invention, and it is our intention to cover by our claim any modified forms of structure or use of mechanical equivalents which may be reasonably included within their scope.

We claim as our invention:

A crop gathering device comprising a pair of laterally spaced shafts, said shafts including helically arranged conveyor blades attached thereto, a portion of said blades including projections for raising crop stalks, said shafts being angularly positioned and converging rearwardly, the portion of said blades having said projections being of increasing diameter progressively rearwardly and thence of decreasing diameter progressively rearwardly, the balance of said conveyor blades being of auger conformation and of uniform diameter.

References Cited in the file of this patent

UNITED STATES PATENTS

| | | |
|---|---|---|
| 690,841 | Degenhard | Jan. 7, 1902 |
| 2,501,782 | Mock | Mar. 28, 1950 |
| 2,648,944 | Powers | Aug. 18, 1953 |
| 2,816,804 | Harrer | Dec. 17, 1957 |

FOREIGN PATENTS

| | | |
|---|---|---|
| 897,777 | France | June 12, 1944 |

OTHER REFERENCES

Agricultural Engineering, July 1954, pp. 500 and 504. "Combining Corn," Pickard and Bateman. Copy in Div. 5, U.S. Patent Office.